United States Patent

Morner et al.

[11] Patent Number: 5,769,345
[45] Date of Patent: Jun. 23, 1998

[54] SEAT BELT RETRACTOR

[75] Inventors: Bengt Morner, Hovas, Sweden; David Bartram, Milton Keynes, England

[73] Assignee: Tensator Limited, Bucks, United Kingdom

[21] Appl. No.: 731,871

[22] Filed: Oct. 21, 1996

[30] Foreign Application Priority Data

Oct. 23, 1995 [GB] United Kingdom .................... 9521672

[51] Int. Cl.⁶ ..................................................... B60R 22/44
[52] U.S. Cl. ........................................................ 242/375.3
[58] Field of Search ............................. 242/375.1, 375.3; 280/805, 806, 807

[56] References Cited

U.S. PATENT DOCUMENTS

| | | | |
|---|---|---|---|
| 4,036,449 | 7/1977 | Schreiber | 242/375.3 |
| 4,125,231 | 11/1978 | Henderson | 242/375.3 |
| 4,301,977 | 11/1981 | Yang | 242/375.3 |
| 4,640,472 | 2/1987 | Epple | 242/375.3 |
| 5,297,752 | 3/1994 | Brown et al. | |
| 5,411,222 | 5/1995 | Gray et al. | 242/375.3 |

FOREIGN PATENT DOCUMENTS

| | | | |
|---|---|---|---|
| 3-200454 | 9/1991 | Japan | 280/806 |
| 1532509 | 11/1978 | United Kingdom . | |
| 2072490 | 10/1981 | United Kingdom . | |

*Primary Examiner*—John P. Darling
*Attorney, Agent, or Firm*—Spencer & Frank

[57] ABSTRACT

A seat belt retractor includes a spool, a single spring adapted to impart a rotational force to the spool to wind the seat belt onto the spool, and a mechanism to cause the spring to apply to the spool a first force, which is a relatively high force, only during the initial stages of extraction of the seat belt from the spool and during the final stages of retraction of seat belt onto the spool, and to apply a second lower force to the spool during the remaining part of the cycle of operation of the spool.

8 Claims, 8 Drawing Sheets

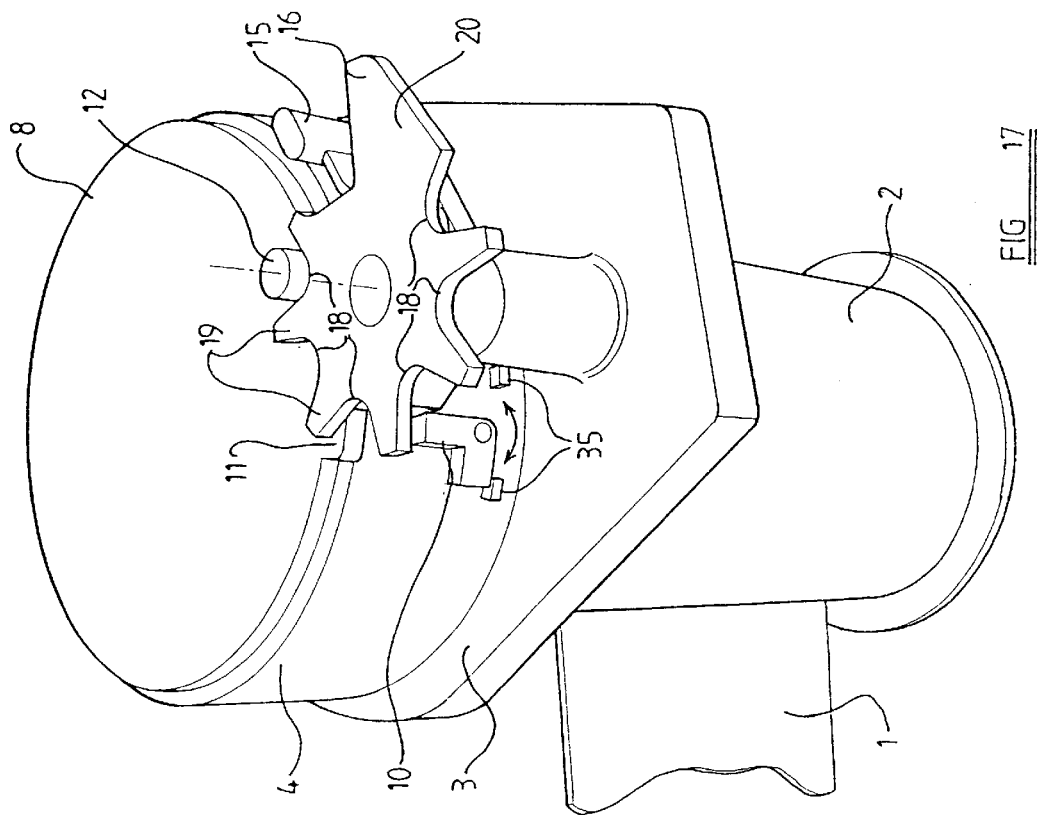
FIG. 17
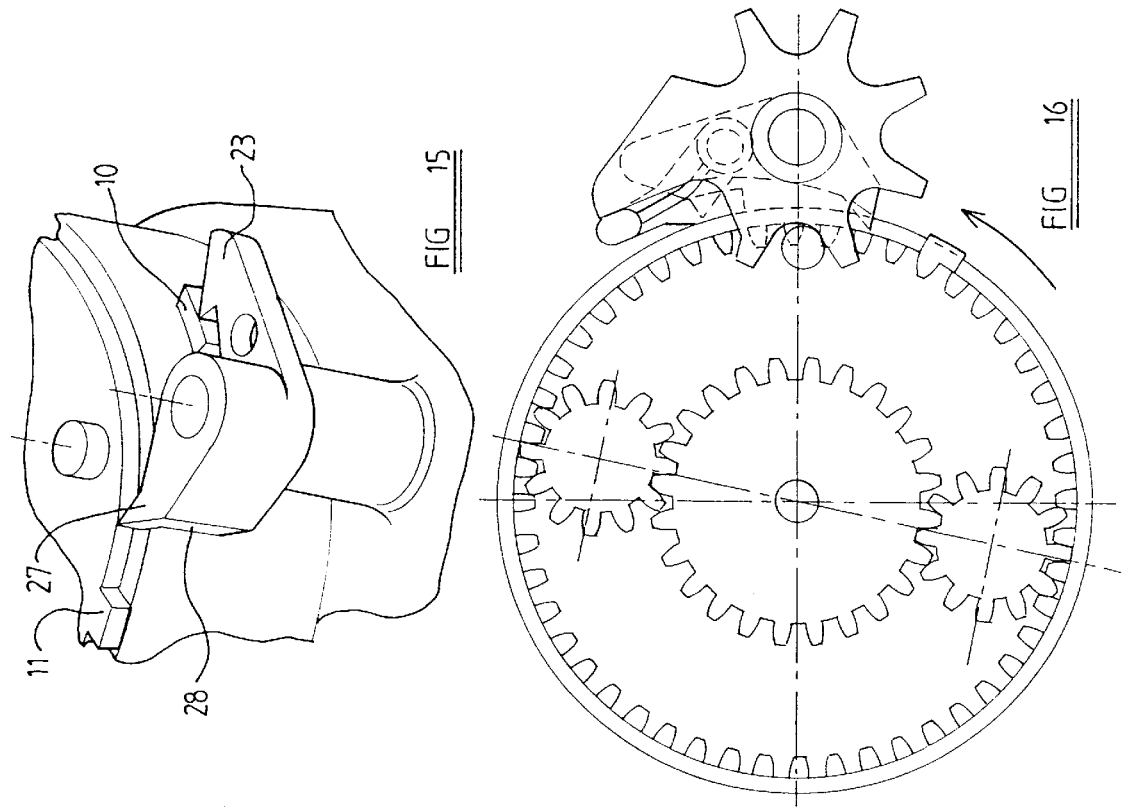
FIG. 15
FIG. 16

SEAT BELT RETRACTOR

The present invention relates to a seat belt retractor and more particularly relates to a seat belt retractor adapted for use in a motor vehicle.

BACKGROUND OF THE INVENTION

Many seat belt retractors have been proposed before for use in a motor vehicle.

Ideally a seat belt retractor should have a spring strong enough so that when the seat belt is released, the seat belt is fully wound onto the spool of the seat belt retractor so that the remaining part of the belt extends in a tidy manner from the seat belt retractor to the anchorage point. However, if a spring of sufficient strength to achieve this function is provided, it is often the case that when part of the seat belt has been withdrawn from the retractor, such as, for example, when the seat belt is actually in use, the tension then exerted by the spring on the seat belt is substantial. This means that when the seat belt is being worn, the person wearing the seat belt may experience substantial tension in the seat belt pressing against their chest. The existence of such a tension is uncomfortable and may discourage people from wearing seat belts.

Consequently, it would be most desirable to be able to provide a seat belt retractor which only presented a relatively low tension in the seat belt when the seat belt was actually in use, but which applied sufficient tension to the seat belt when the seat belt was being wound in to the retractor so that, when the seat belt is fully wound onto the retractor, the seat belt extends in a tidy manner from the retractor to the anchorage point.

SUMMARY OF THE INVENTION

According to this invention there is provided a seat belt retractor comprising a spool, a single spring means adapted to impart a rotational force to the spool to wind the seat belt onto the spool, means being provided to cause the spring to apply to the spool a first force, which is a relatively high force, only during the initial stages of extraction of the seat belt from the spool and during the final stages of retraction of seat belt onto the spool, and to apply a second lower force to the spool during the remaining part of the cycle of operation of the spool.

Preferably, the spring is connected in series with a gear arrangement, the condition of which dictates the force applied by the spring, one end of the spring being connected to the spool, the gear arrangement being located between the spool and a stationary part of the retractor.

Preferably the gear arrangement has two conditions, in one condition the first force being applied, and in the second condition the second force being applied, means being provided to selectively change the condition of the gear arrangement.

Conveniently the gear arrangement comprises a planetary gear arrangement. The planetary gear arrangement may comprise a sun gear to co-rotate with the shaft of the spool, at least one planet gear associated with a planet gear carrier and a ring gear, the single spring being connected between the ring gear and the shaft of the spool, the arrangement being such that the ring gear is free to rotate and the planet gear carrier is retained in position during the initial stage of extraction of the seat belt from the retractor and during the final stage of retraction of the seat belt onto the retractor, and such that movement of the ring gear is prevented, whilst movement of the planet gear or gears is permitted during the remaining part of the cycle of operation.

Advantageously a pawl is provided adapted to engage and release stop surfaces provided on the ring gear and the planet gear carrier, means being provided to move the pawl at pre-determined stages in the cycle of operation of the retractor.

Preferably the pawl is provided with two cooperating means adapted to retain, within the pawl, the stop surface provided on the ring gear, the pawl having means adapted to engage the stop surface carried by the planet carrier to prevent rotation of the planet carrier in a pre-determined direction.

Preferably the pawl is associated with a release lever, means being provided to actuate the release lever to cause the pawl to move to a condition in which the stop surface carried by the ring gear is released.

Conveniently the release lever is pivotally mounted on part of the pawl and is movable so that part of the lever engages a fixed point, the lever pivoting about the fixed point to move the said part of the pawl.

Preferably a toothed wheel is provided, mounted to be rotated by means of a projection carried by the planet gear carrier on rotation thereof, the toothed wheel carrying engagement means being adapted to engage the said release lever to initiate the release of the stop surface carried by the ring gear.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 11 is a view of the components when in the condition of FIG. 10, with the belt beginning to be pulled in;

FIG. 15 is an enlarged view illustrating the position of certain components shortly after FIG. 14; and FIG. 16 is another view illustrating the position of the components in the position of FIG. 15; and FIG. 17 is a view corresponding to FIG. 1 but illustrating a slightly modified embodiment.

DESCRIPTION OF THE PREFERRED EMBODIMENTS

The Figures illustrate the retractor in an orientation selected for clarity of illustration. In use of the retractor the spool would be horizontal.

Figure 1:
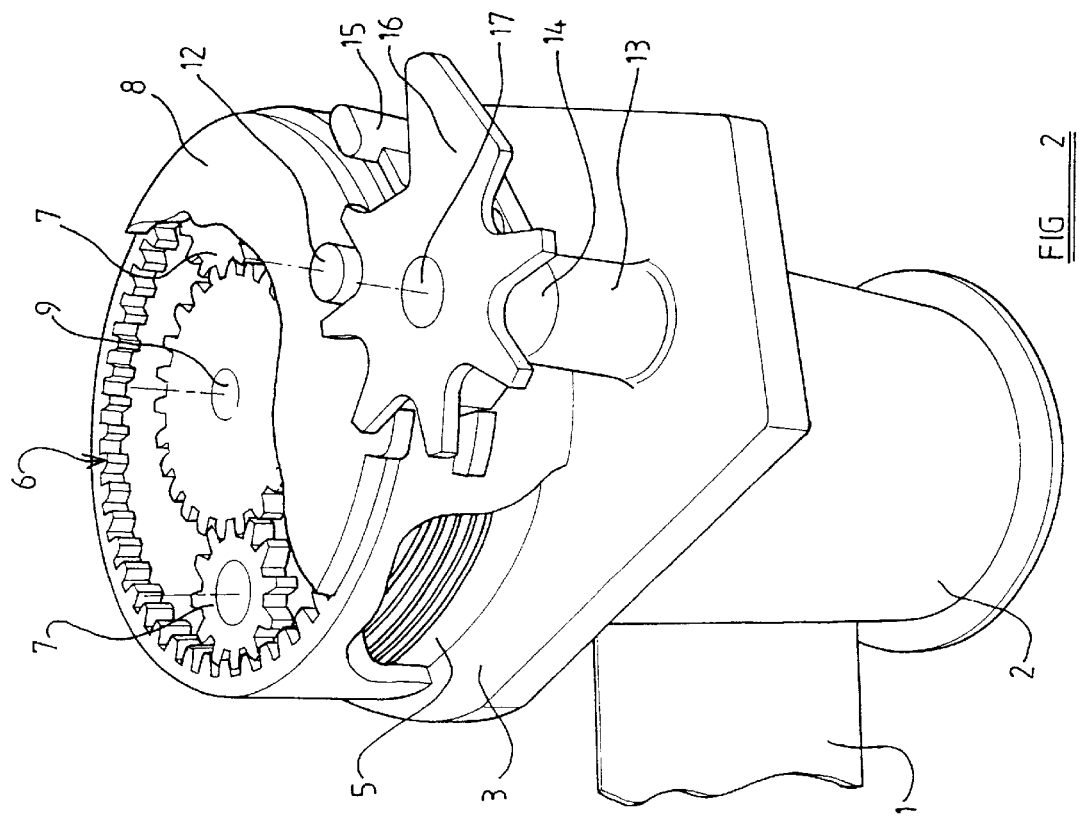
FIG. 1 is a perspective view of part of a retractor mechanism in accordance with the invention.
Figure 2:
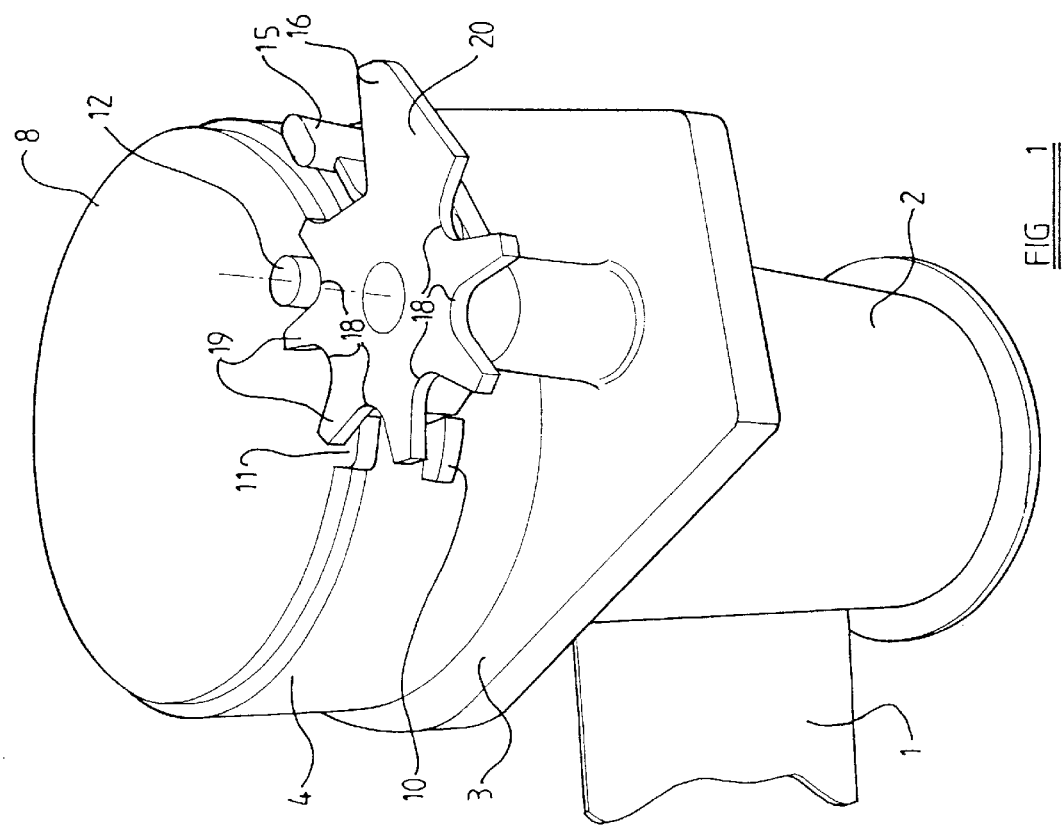
FIG. 2 is a view corresponding to FIG. 1 with parts thereof cut away to illustrate more clearly the operative parts of the embodiment.

Referring initially to FIGS. 1 and 2 of the accompanying drawings, a retractor mechanism is provided adapted to wind a seat belt 1 onto a spool 2. At one end of the spool a mount or support 3 is provided, in the form of a plate. The shaft of the spool passes through an appropriate aperture formed in the plate. A tension spring housing 4 is provided, which is mounted for rotation about the axis of the spool 2. A tension spring 5 of conventional design is provided within the housing, one end of the tension spring 5 being connected to the housing, the other end being connected to the shaft of the spool 2.

As can be seen most clearly in FIG. 2, the upper part of the housing, in the orientation shown, defines on its inner surface a ring gear 6. As will be described hereinafter, the ring gear forms part of a planetary gear assembly. The ring gear 6 cooperates with two planet gears 7 (although it is to be appreciated that in alternative embodiments of the invention, three or more planet gears may be provided). The planet gears 7 are connected to a plate 8 that forms a closure for the housing 4. The plate 8 is mounted for rotation relative to the shaft of the spool 2 and acts as a planet carrier.

Mounted on the shaft of the spool 2, or an extension thereof, is a sun gear 9. It is to be observed that the teeth of the sun gear 9 mesh with the teeth of the planet gears 7 and the teeth of the planet gears 7 mesh with the teeth of the ring gear 6.

The housing 4 therefore comprises, not only a housing for the spring 5, but also a ring gear housing. A ring gear tab 10 is provided in the form of a projection extending radially outwardly from the exterior of the ring gear housing 4. A plate tab 11 is provided which extends radially outwardly from the edge of the plate 8. Alternatively a recess could be provided in the edge of the plate 8 to perform the same function as the tab 11 and references in this document to a tab are therefore to be construed as covering a tab or a recess performing an equivalent function i.e. defining a surface which engages with part of a pawl to be described hereinafter. Similarly the ring gear tab 10 could be replaced by a recess. The plate tab 11 is therefore formed integrally with the carrier of the planet gears 7. A plate peg 12 is also provided which extends upwardly from the upper surface of the plate 8 (in the orientation of FIGS. 1 and 2), the peg 12 being located adjacent the periphery of the plate 8.

The support 3 is provided with a boss 13 located at a position adjacent the periphery of the ring gear housing 4. A pawl member 14 is pivotally mounted on the boss 13, the pawl member being illustrated more clearly in FIGS. 3 and 4. Pivotally mounted on the pawl member 14 is a release lever 15, and the release lever 15 is illustrated more clearly in FIG. 4. Rotatably mounted on the boss 13 at a position above the pawl 14 is a star wheel 16.

The pawl 14 and the star wheel 16 may rotate about an axis 17 carried by the boss 13.

The star wheel comprises, about its periphery, a number, for example, six substantially evenly spaced recesses 18, the bases of the recesses spanning an arc of approximately 210°. Adjacent recesses 18 are separated by substantially uniform teeth 19. The two recesses which are separated by an arc of approximately 150° have between them a radially outwardly projecting arm 20 having a much greater radial extent than the radial extent of the teeth 19. As will be described hereinafter in greater detail, the arm 20 is adapted to cooperate with the release lever 15.

Figure 4:
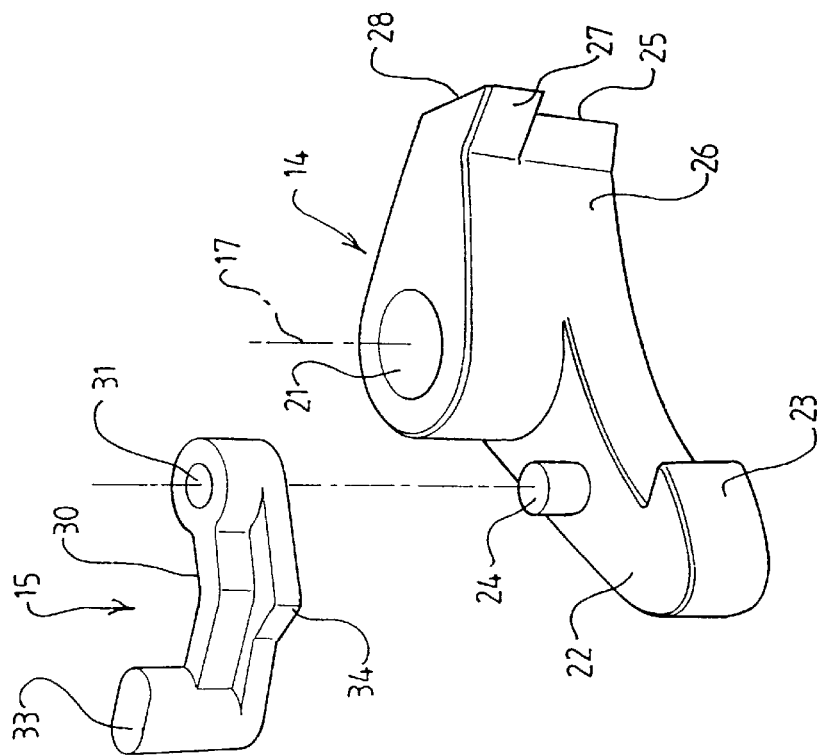
FIG. 4 is a perspective view of the pawl and release lever.
Figure 3:
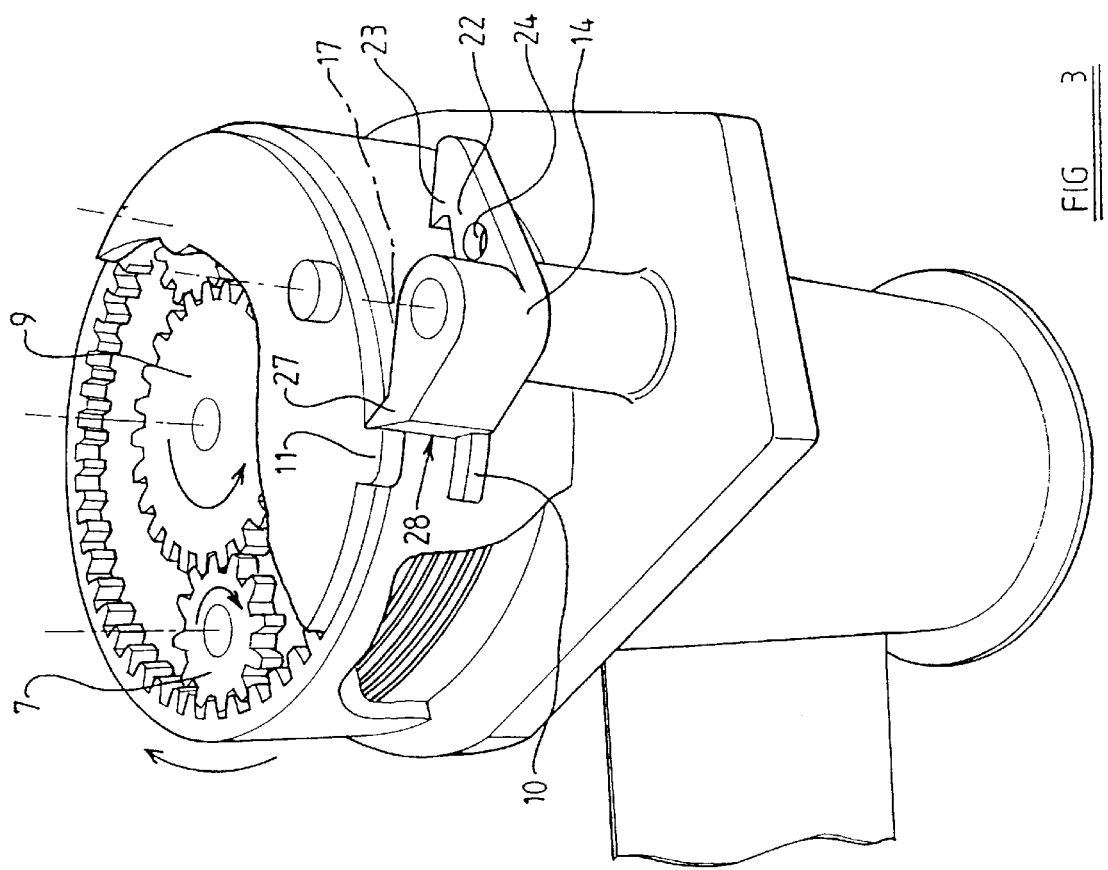
FIG. 3 is a view corresponding to FIG. 1 with even more parts cut away.
Figure 5:
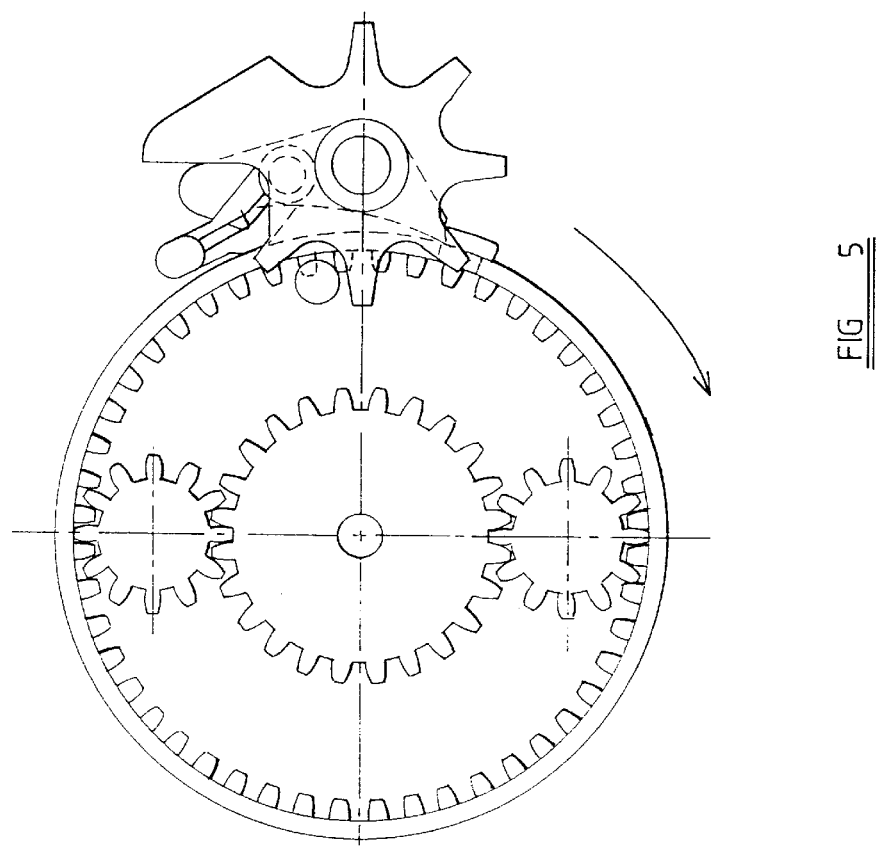
FIG. 5 is a diagrammatic view of the operative parts of the illustrated embodiment of the invention at the commencement of belt pull-out.

Turning now to FIGS. 3 and 4, the pawl 14 has a bore 21 adapted to accommodate the pivot axis 17 carried on the boss 13. The pawl has a lower part which defines, to one side of the bore 21, an arm 22 which terminates with an inwardly directed hook 23. The arm 22 is provided with a pin 24 which engages in a bore which forms a pivot by which the release lever 15 is mounted for pivotal movement relative to the arm 22.

The lower part of the pawl defines, on the other side of the bore 21, an inwardly directed projection 25 which defines an abutment face 26. The abutment face 26 is opposed to the hook 23.

The upper part of the pawl does not extend over the arm 22, but only extends above that part of the pawl that defines the projection 25 and the abutment face 26. The upper part of the pawl defines a projecting beak 27 which extends forwardly at a position located a greater distance from the bore 21 than the abutment face 26. The beak has an outside face 28.

The release lever 15 comprises an element 30 defining an aperture 31 adapted to receive the pivot pin 24 formed on the arm 22 of the pawl. The arm 15 terminates with an upstanding oval-shaped engagement 33. The front face of the arm defines a projecting corner 34.

As can be appreciated from FIG. 3, the pawl is so located that the ring gear housing tab 10 and the plate tab 11 can both engage the outside face 28 of the beak 27 of the pawl. The tabs are biassed into contact with the beak 27 by tension provided by the spring 5. It is also to be appreciated that the hook 23 and the abutment face 26 are co-aligned with the ring gear tab 10.

As will become clearer from the following description, the function of the pawl is to engage and release the ring gear housing and the plate (which is acting as a planet carrier) at pre-determined moments during the operating cycle of the retractor.

When the seat belt is initially pulled out of the retractor, the plate 8 is effectively prevented from rotating. Rotation of the sun gear 9, caused by rotation of the spool 2, thus causes the ring gear housing or spring housing 4 to rotate with a direction of rotation opposite to the direction of rotation of the shaft of the spool 2, that is to say with a rotation opposite to the rotation of the sun gear. Consequently, for each rotation of the shaft, the inner end of the spring is wound in by one complete turn, but also the outer end of the spring is wound in. Typically, for each turn of the shaft, the ring gear housing will effect one half of a turn. This means that substantial tension has to be applied to the seat belt to pull the seat belt out, but since the seat belt is commencing from a condition in which the seat belt extends relatively tautly between the retractor mechanism and the anchorage point (passing, of course, any guide loops that may be provided) the tongue of the seat belt is usually in a position adjacent one shoulder of the person who is to use the seat belt, meaning that the person may be able to grasp the tongue of the seat belt and pull it with their other hand, applying a substantial force to the seat belt.

After the ring gear housing 4 has executed one complete revolution, the ring gear housing is locked in position and the plate 8 that acts as the planet carrier is then free to rotate. The planet gears then rotate, while the ring gear housing 4, that is to say the spring housing, remains stationary. In this condition, for each single turn of the shaft, only a single turn is applied to the spring. This means that the tension needed to pull out the seat belt is substantially reduced. Equally, of course, the tension applied by the seat belt to the chest of a person wearing the seat belt is also substantially reduced.

When the seat belt is eventually released, the cycle of operation is effectively reversed. As the seat belt begins to be withdrawn into the retractor mechanism only a low spring tension is applied, since for each revolution of the shaft there is only one "turn" of spring available. However, as the final part of the seat belt is drawn in, the plate 8 is again locked in position or prevented from rotating and the ring gear housing 4 is permitted to rotate, meaning that for every turn of the spool there is more than one "turn" of the spring available. This means that a more substantial tension may be generated in the seat belt as the final length of seat belt is wound onto the retractor.

FIGS. 1 to 3 and 5 illustrate the situation that exists at the commencement of the cycle of operation. In this condition of the seat belt retractor, the seat belt is fully wound in on the spool. It can be seen that the ring gear tab 10 and the plate tab 11 both engage the outside face 28 of the beak 27 of the pawl 14. As the seat belt is drawn out an anti-clockwise rotation is imparted to the sun gear 9. This generates a clockwise rotation in the planet gears 7. Also a force is generated which attempts to rotate the top plate in a counter-clockwise direction. However, rotation of the top plate in this direction is prevented by engagement of the top plate tab 11 with the pawl 14. As a consequence a force is generated which causes the ring gear housing 4 to rotate in the clockwise direction. Since the pawl 14 is located towards right of the tab as illustrated in FIG. 3, the ring gear housing 4 is free to rotate in the clockwise direction.

Consequently during the initial withdrawal of the seat belt, the top plate 8 remains stationary and the ring gear housing 4, which accommodates the spring 5, rotates in a clockwise direction whilst the sun gear 9 and the spool 2 rotate in the anti-clockwise direction. Consequently the number of "turns" of the spring 5 exceed the number of "turns" of the spool 2, thus applying substantial tension to the seat belt 1.

Figure 6:
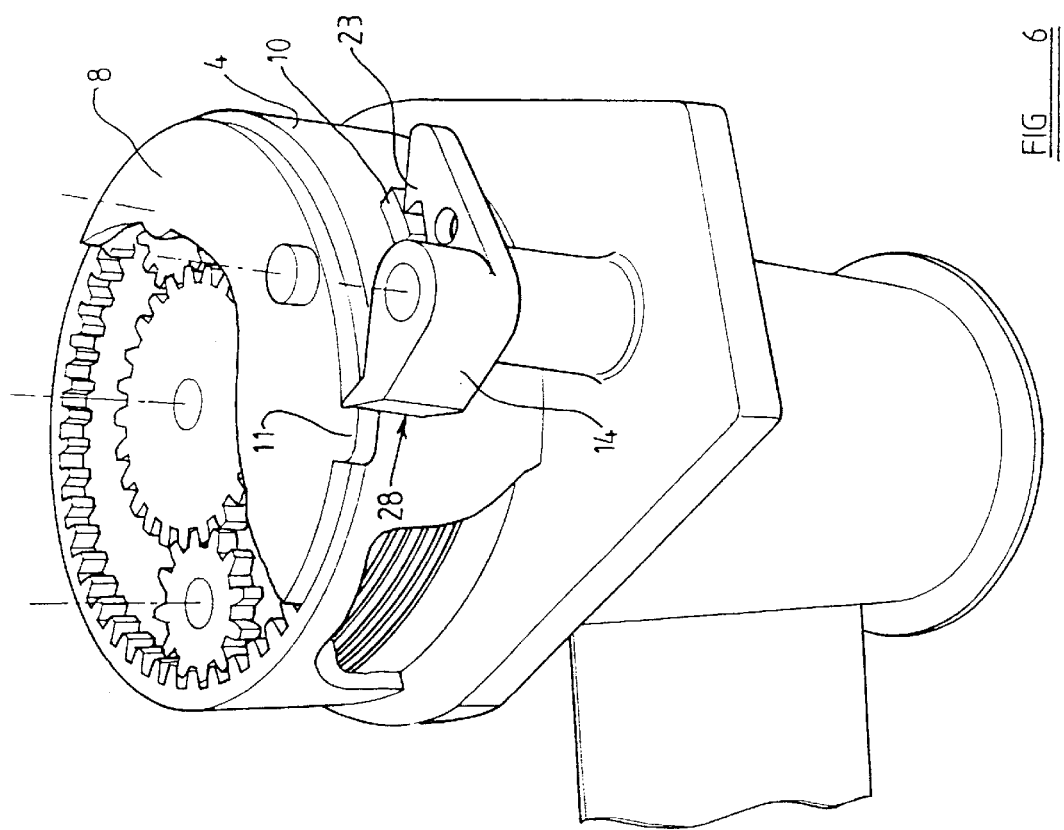
FIG. 6 is a view of the described embodiment, with parts cut away, illustrating the position after a pre-determined length of belt has been pulled out.
Figure 7:
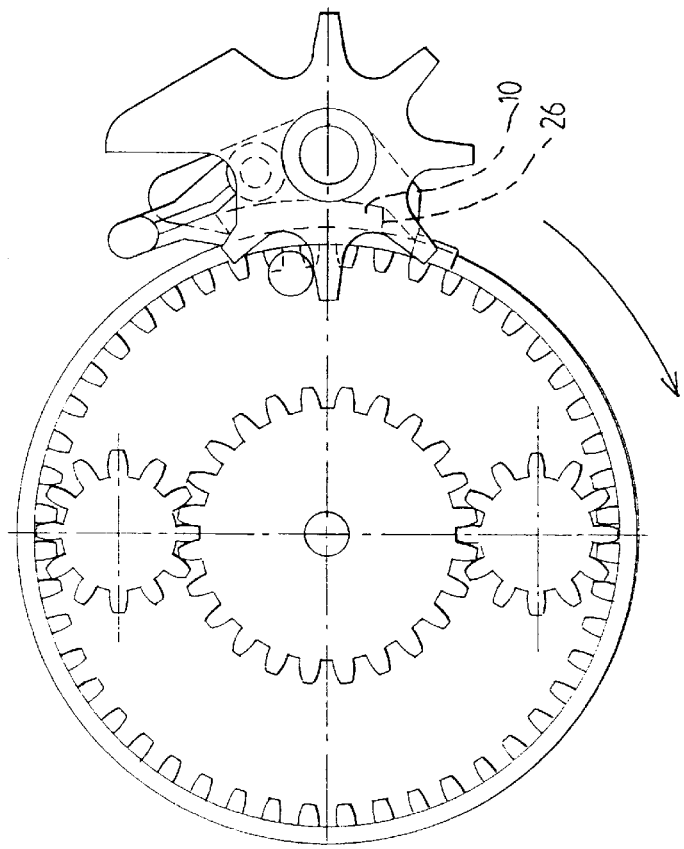
FIG. 7 is a diagrammatic view illustrating the position of components of the illustrated embodiment when slightly more belt has been pulled out than is the situation in FIG. 6.
Figure 8:
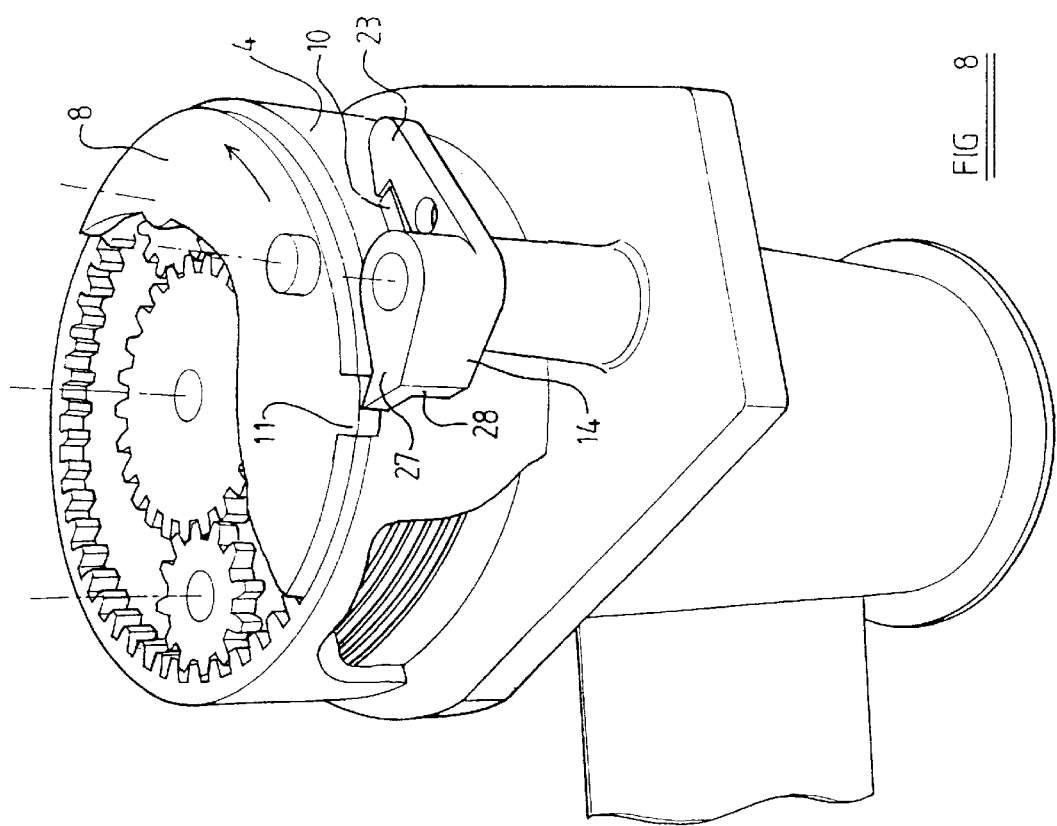
FIG. 8 is a view which illustrates the components of the invention when slightly more belt has been pulled out than is the situation in FIG. 7.

When a pre-determined length of seat belt has been paid out, the components reach the position illustrated in FIG. 6. It can be seen that the top plate 8 is still in its initial position, since the top plate 8 has not moved. The plate tab 11 is thus still in contact with the outside face 28 of the pawl 14. However, the ring gear housing 4 has completed almost a full revolution and the ring gear housing tab 10 is passing adjacent the hook 23. As the ring gear housing tab 10 passes the hook 23 it engages the abutment face 26 provided on the projection 25, this condition being illustrated in FIG. 7. This causes the pawl to pivot in a counter-clockwise direction as viewed from above. Consequently the beak 27 moves slightly away from the ring gear housing 4, whilst the hook 23 moves closer towards the ring gear housing 4. This position of the pawl is illustrated in FIG. 8.

It can be observed that the beak 27 has moved sufficiently away from the plate 8 so that the plate tab 11 is no longer engaged by the pawl. The continuing outward pull of seat belt tends to move both the plate 8 and the ring gear housing 4 in the counter-clockwise direction. The ring gear tab 10, however, engages the hook 23 after only a very short distance of movement, as especially illustrated in FIG. 8. Thus the ring gear housing 4 is prevented from moving in the counter-clockwise direction, but the top plate 8 is free to move in the counter-clockwise direction. The planet gears 7 thus now "freewheel" and for each revolution of the sun gear there is only one "turn" added to the spring. Thus the tension applied by the spring is substantially reduced.

Figure 9:
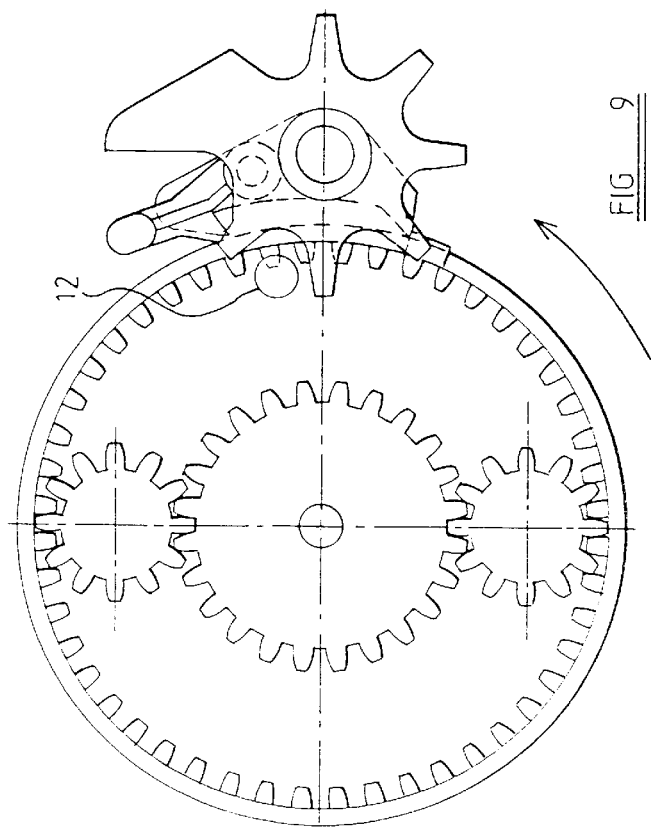
FIG. 9 is another view illustrating the components in the position that they have in FIG. 8.

As can be seen from FIG. 9, the top plate peg, the position of which is indicated by the circle 12, is free to leave the recess 18 that initially accommodates it, and will rotate in a counter-clockwise direction as the top plate rotates. However, after one rotation of the top plate the peg 12 will engage the tooth 19 separating the first two recesses, and will cause the star wheel to index by approximately 45°.

Figure 10:
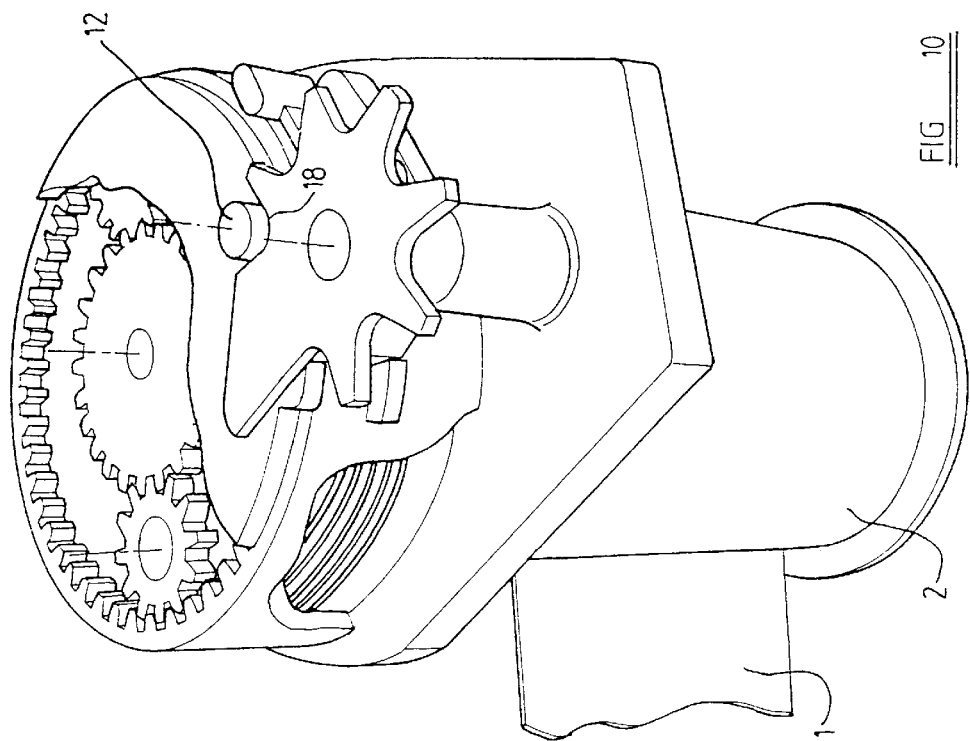
FIG. 10 is a view illustrating the position of the components when the belt has been fully pulled out.

Each successive revolution of the top plate will cause the star wheel to rotate by another 45° until the condition illustrated in FIG. 10 is reached in which the seat belt is fully withdrawn and/or the top plate peg 12 has passed the last recess 18 of the star wheel 16.

Figure 11:
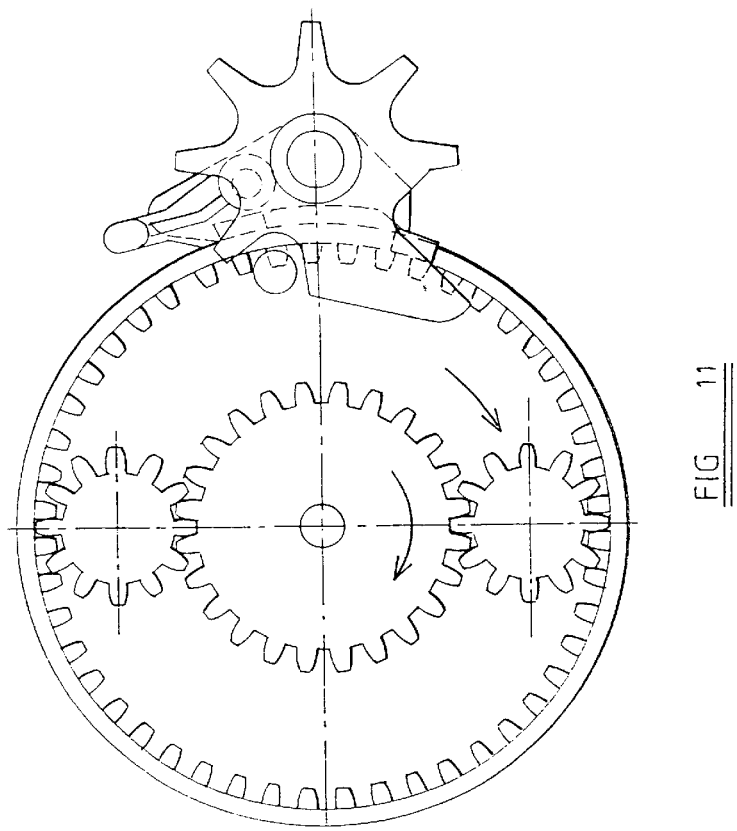
Figure 14:
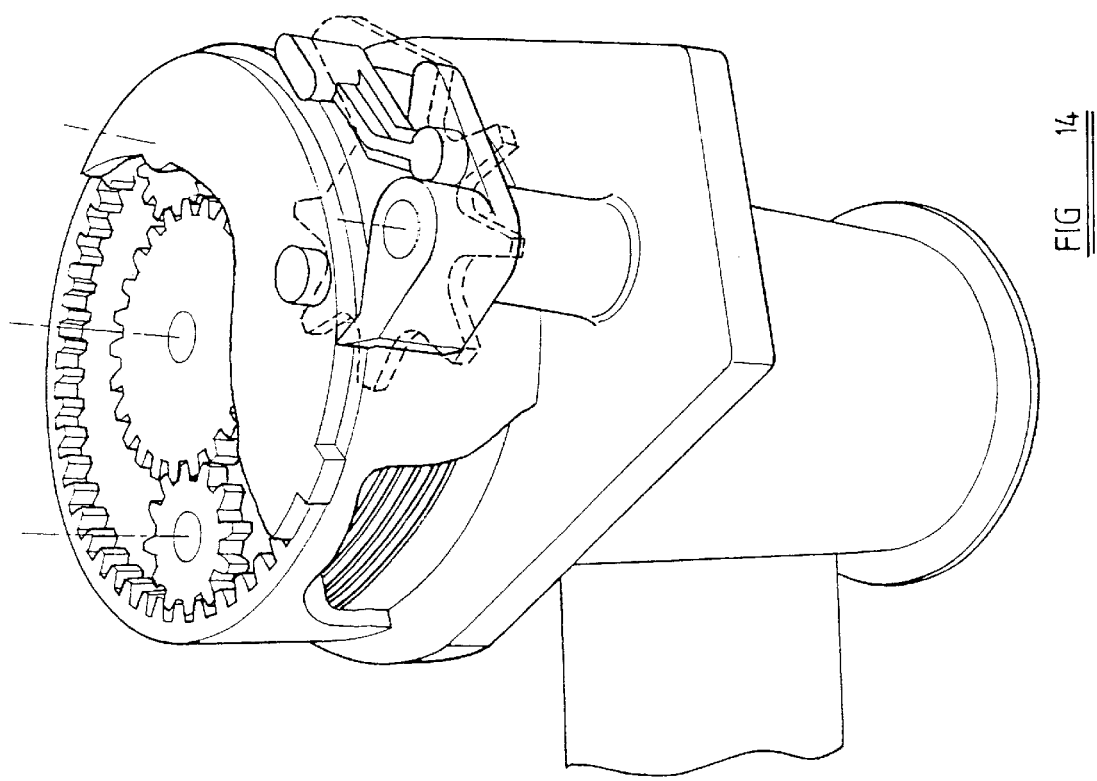
FIG. 14 is a view, partly in phantom, illustrating the position of the components in the position of FIGS. 12 and 13.

With the retractor in this position rewinding of the belt may commence. As rewinding commences the sun gear starts to rotate in the clockwise direction as illustrated in FIG. 11, causing the top plate to rotate in the clockwise direction.

Figure 12:
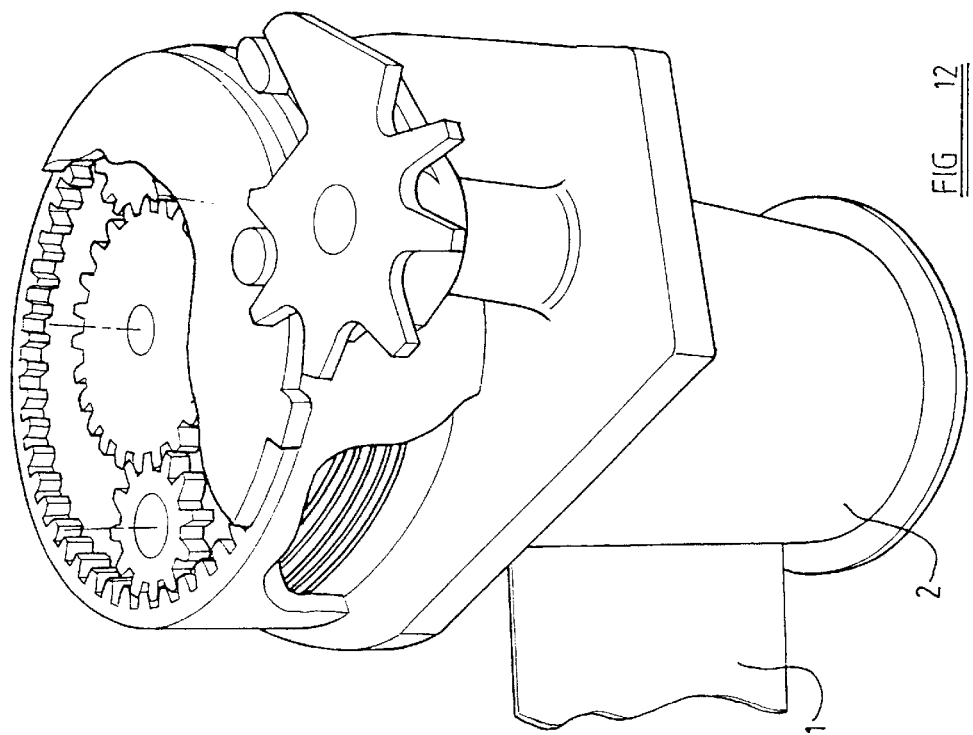
FIG. 12 is a view illustrating the position of the components when the belt has been nearly fully retracted.

The top plate will rotate in the clockwise direction as the seat belt is rewound onto the spool until the condition illustrated in FIG. 12 is achieved, in which the top plate peg 12 is again accommodated in the first recess 18 of the star wheel 16.

Figure 13:
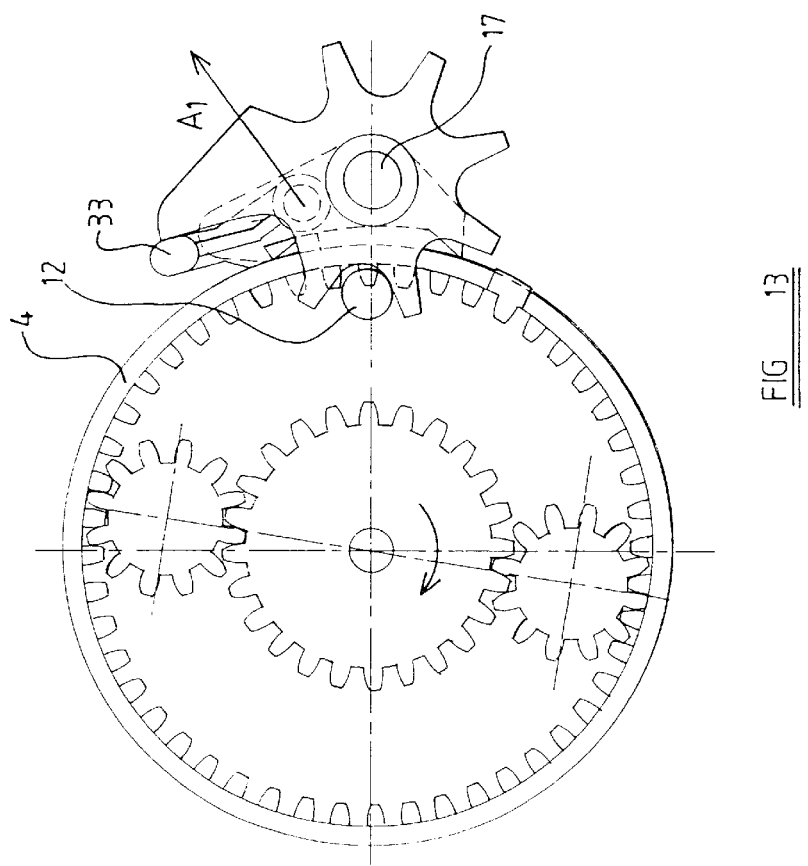
FIG. 13 is another view showing the position of the components in FIG. 12.

As can be appreciated most clearly from FIG. 13, as the top plate peg 12 continues to rotate in a clockwise direction, the arm 20 that extends radially outwardly from the star wheel 16 contacts the engagement 33 provided at the end of the arm 30 forming the release lever 15. This urges the corner 34 provided on the arm 30 into contact with the exterior of the ring gear housing 4. The release lever 15 thus tends to pivot about the pivot point defined by the corner 34. This moves the bore 31 in arm 30 and pin 24 on arm 22 outwardly, relative to the ring gear housing 4, as illustrated by the arrow A in FIG. 13. This tends to rotate the pawl in a clockwise direction about the axis 17. This moves the hook 23 away from the housing, as shown in FIG. 15, which permits the ring gear tab 10 to escape, thus permitting the ring gear housing to rotate in the counter-clockwise direction, but also moves the beak 27 of the pawl radially inwardly.

Since the top plate 8 is prevented from moving in the in the counter-clockwise direction by the beak 27 engaging in the tab 11 or recess in the edge of plate 8, the planet gears 7 are fixed in position and a force is applied to the ring gear housing tending to rotate the ring gear housing in the counter-clockwise direction.

Since the hook 23 has now effectively released the ring gear tab 10, the ring gear can rotate in the counterclockwise direction. As the ring gear rotates in the counter-clockwise direction, there is more than one "turn" of spring for each turn of the shaft. Consequently a relatively high tension is applied to the seat belt during this phase of the operation of the device. When the seat belt has been fully retracted the tab 10 on the ring gear again engages the outside face 28 of the beak 27, returning the apparatus to the condition illustrated in FIGS. 1 to 4.

The cycle of operation may then be repeated.

It is to be appreciated that in the described embodiment of the invention one spring is provided, which is capable of applying either a first relatively high force to the seat belt, at the commencement of the cycle of operation, to ensure that the seat belt is fully wound onto the spool, and which is capable of applying a second or lower force to the spool at a subsequent point during the cycle of operation, so that only a relatively low tension is present in the belt when the belt is actually being worn. This makes the belt more comfortable and makes an occupant of a motor vehicle more likely to wear the belt.

Means are provided to switch from one tension applied to the spool by the single spring to a different tension applied to the spool by the single spring. It is possible, as in the present example of the invention, to utilise a relatively weak spring, means being provided to enhance the tension applied to the spool by the spring during the stage of operation of the retractor where the last short length of seat belt is being drawn into the retractor. Alternatively, of course, it is possible to use a relatively strong spring, providing means to reduce the force applied to the spool when a pre-determined length of seat belt has been withdrawn from the retractor. Whilst, in the described arrangement, a planetary gear and pawl arrangement is provided, many other options exist. It is possible to utilise a planetary gear arrangement with some other mechanism adapted to lock the planet carrier and release the ring gear and vice-versa. The locking and release mechanism might be actuated by a sensor which is responsive to the diameter of belt wound on the spool. Alternatively, an actuator could be provided which is driven by a "scroll". A "scroll" is an element adapted to co-rotate with the shaft of the retractor, provided with a spiral groove formed in it. An actuator may have a pin inserted in the spiral groove so that, as the retractor is actuated, the actuator is moved inwardly and outwardly. The actuator may comprise a lever pivoted at one end, and with a pin inserted in the scroll located at a substantially central point. The free end of the lever may actuate an appropriate mechanism to engage and release the ring gear and planet carrier of a planetary gear assembly. Alternatively the lever may actuate some other form of gearbox or gear arrangement.

FIG. 17 illustrates a slightly modified embodiment in which the ring gear housing tab 10 embodiment in which the ring gear housing tab 10 is replaced by a L-shaped, pivotally mounted lever which co-operates with projections 35 formed integrally with the outer surface of the ring hear housing 4 in such a way that as belt webbing is withdrawn, the ring gear housing 4 is only prevented from rotating after two complete revolutions (as opposed to one in the previously described embodiment) . Thus the change from the high force being exerted by the spring to a reduced force being exerted takes place after a greater length of webbing has been paid out (corresponding to four revolutions of the spool). It will be appreciated from a study of FIG. 17 that during initial belt withdrawal, after one revolution of the ring gear housing 4, the raised arm of the L-shaped lever 10 will engage the abutment face 26 provided on the projection 25 of the pawl 14. However, rather than causing the pawl to pivot in a counter-clockwise direction the lever 10 will itself pivot, allowing continued rotation of the ring gear housing 4. The pivoting of the lever 10 will however have moved the other arm of the L-shaped lever to a raised position and following one further rotation of the ring gear housing 4 in the clockwise direction this other arm will come into engagement with the abutment face 26 whilst the first arm will be firmly pressed against the right hand projection 35 and at this instant the pawl 14 will be pivoted in an anti-clockwise direction, as viewed from above, thereby causing the change from a high force being exerted by the spring to a low force being exerted by the spring. The arrangement operates in the opposite manner upon retraction of the belt. In all other respects the embodiment of FIG. 17 operates in the same manner as that of the previously described embodiment.

As mentioned above whilst a tab 11 has been illustrated on the plate 8 this could be replaced by a recess which defines a surface to engage the beak 27 of the pawl 14. Similarly the ring gear tab 10 could be replaced by a recess.

What is claimed is:

1. A seat belt retractor, comprising:

a spool having a shaft;

a single spring means adapted to impart a rotational force to the spool tending to wind the seat belt onto the spool during a cycle of operation in which the seat belt is extracted from the spool and later retracted onto the spool; and force-adjusting means for causing the single spring means to apply to the spool a first force, which is a relatively high force, only during an initial stage of extraction of the seat belt from the spool and during a final stage of retraction of the seat belt onto the spool, and to apply a second lower force to the spool during the remaining part of the cycle of operation of the spool, wherein the force-adjusting means comprises a planetary gear arrangement which includes a sun gear to co-rotate with the shaft of the spool, at least one planet gear associated with a planet gear carrier and a ring gear, the single spring means connected between the ring gear and the shaft of the spool, the planetary gear arrangement being such that the ring gear is free to rotate and the planet gear carrier is retained in position during the initial stage of extraction of the seat belt from the spool and during the final stage of retraction of seat belt onto the spool, and such that movement of the ring gear is prevented, whilst movement of the at least one planet gear is permitted, during the remaining part of the cycle of operation.

2. A retractor according to claim 1, wherein the force-adjusting means further comprises stop surfaces provided on the ring gear and the planet gear carrier, a pawl adapted to engage and release the stop surfaces, and means for moving the pawl at pre-determined stages in the cycle of operation of the spool.

3. A retractor according to claim 2 wherein the pawl is provided with two cooperating means adapted to retain, within the pawl, the stop surface provided on the ring gear, the pawl having means adapted to engage the stop surface provided on the planet carrier to prevent rotation of the planet carrier in a pre-determined direction.

4. A retractor according to claim 3, wherein the means for moving the pawl comprises a release lever associated with the pawl, and means for actuating the release lever to cause the pawl to move to a position in which the stop surface provided on the ring gear is released.

5. A retractor according to claim 4, wherein the release lever has a corner portion, and wherein the release lever is pivotally mounted on part of the pawl and is movable so that the corner portion of the lever engages the ring gear, the lever pivoting about the corner portion to move said part of the pawl.

6. A retractor according to claim 5, wherein the means for actuating the release lever comprises a projection carried by the planet gear carrier, a toothed wheel mounted to be rotated by the projection carried by the planet gear carrier on rotation thereof, and engagement means carried by the toothed wheel for engaging the release lever to initiate the release of the stop surface provided on the ring gear.

7. A retractor according to claim 4, wherein the means for actuating the release lever comprises a projection carried by the planet gear carrier, a toothed wheel mounted to be rotated by the projection carried by the planet gear carrier on rotation thereof, and engagement means carried by the toothed wheel for engaging the release lever to initiate the release of the stop surface provided on the ring gear.

8. A retractor according to claim 3, wherein the means for moving the pawl comprises a release lever that is movably mounted on the pawl, a projection carried by the planet gear carrier, a toothed wheel mounted to be rotated by the projection carried by the planet gear carrier on rotation thereof, and engagement means carried by the toothed wheel for engaging the release lever to initiate the release of the stop surface provided on the ring gear.

* * * * *